United States Patent
Kondo et al.

(10) Patent No.: US 9,778,585 B2
(45) Date of Patent: Oct. 3, 2017

(54) IMAGE FORMING APPARATUS AND IMAGE FORMING METHOD

(71) Applicant: Oki Data Corporation, Tokyo (JP)

(72) Inventors: Tomonori Kondo, Tokyo (JP); Yoshiyuki Nakajima, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 15/212,921

(22) Filed: Jul. 18, 2016

(65) Prior Publication Data

US 2017/0060014 A1    Mar. 2, 2017

(30) Foreign Application Priority Data

Aug. 27, 2015   (JP) ................ 2015-167538

(51) Int. Cl.
| | |
|---|---|
| G06F 15/00 | (2006.01) |
| G03G 9/09 | (2006.01) |
| H04N 1/60 | (2006.01) |
| H04N 1/405 | (2006.01) |
| H04N 1/54 | (2006.01) |

(52) U.S. Cl.
CPC ......... *G03G 9/0926* (2013.01); *H04N 1/405* (2013.01); *H04N 1/54* (2013.01); *H04N 1/6008* (2013.01); *H04N 2201/0094* (2013.01)

(58) Field of Classification Search
None
See application file for complete search history.

(56) References Cited

U.S. PATENT DOCUMENTS

2014/0255053 A1    9/2014  Ohshika
2016/0309060 A1*  10/2016  Fukuda ............... H04N 1/6025

FOREIGN PATENT DOCUMENTS

JP       2014-197165 A    10/2014

* cited by examiner

*Primary Examiner* — Helen Q Zong
(74) *Attorney, Agent, or Firm* — Muncy, Geissler, Olds & Lowe, P.C.

(57) ABSTRACT

An image forming apparatus includes an image process part that creates image data including pixel values of a process color image and pixel values of white which becomes a base of the process color image based on image forming data, and an image forming process part that forms the image on a medium using a process color developer and a white developer based on the image data. Wherein, the image process part that determines a black portion in which a combination of the pixel values of the process color image is regarded as black and a non-black portion in which the combination of the pixel values of the process color image is regarded as a color other than black, and identifies the pixel values of white for the base of the process color image in the image data such that an usage amount of the white developer for the black portion is less than that for the non-black portion.

9 Claims, 10 Drawing Sheets

*Fig. 7*

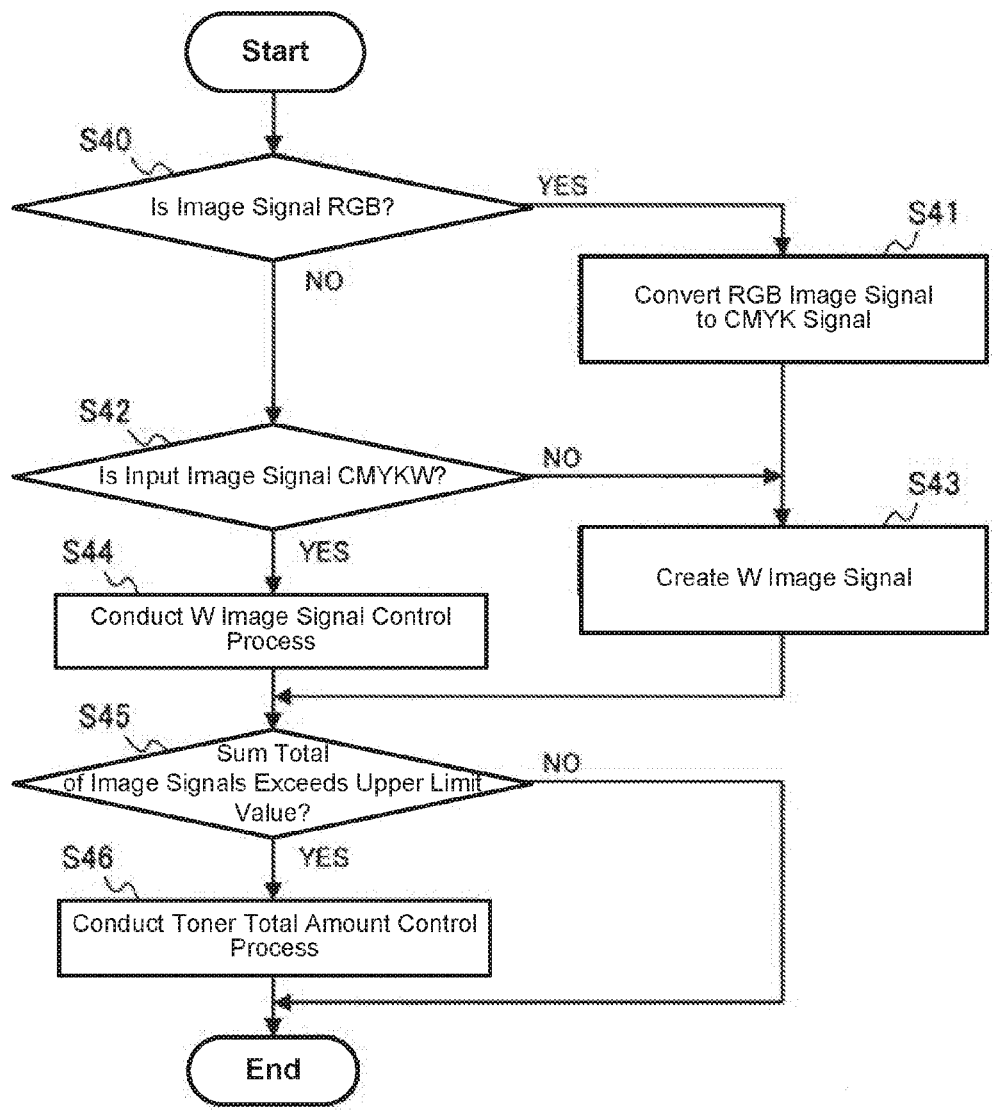

IMAGE FORMING APPARATUS AND IMAGE FORMING METHOD

CROSS REFERENCE TO RELATED APPLICATION

This application claims priority under 35 USC 119 to Japanese Patent Application No. 2015-167538 filed on Aug. 27, 2015, the entire contents which are incorporated herein by reference.

TECHNICAL FIELD

The present invention relates to an image forming apparatus and an image forming method, and specifically relates to an image forming apparatus and an image forming method for forming a base with a white developer.

BACKGROUND

Conventionally, in some image forming apparatuses such as color printers of an electrophotographic system, other than process color developers constituting a print image of cyan (hereinafter also referred to as "C"), magenta (hereinafter also referred to as "M"), yellow (hereinafter also referred to as "Y"), black (hereinafter also referred to as "K"), etc., a white (hereinafter also referred to as "W") developer is used with the aim to shield the base color of the print medium (for example, see Patent Document 1). In the invention, "black color information" means color information corresponding to black that is one of the process color developers. For example, when there are four process color developers, C, M, Y and K, color information regarding the K (which includes a value of 0% to 100%) is used for the information.

RELATED ART

[Patent Doc. 1] Patent Laid Open Publication 2014-197165

However, in a conventional apparatus, when transferring and fusing a process color developer and a white developer to a print medium altogether, since the process color developer sinks into the white developer and they mix with each other, white spots appear on the print result, resulting in poor legibility. Especially when printing in black, in a conventional apparatus, there was a problem that the deterioration of legibility was notable because of the high contrast between black and white.

Therefore, the present invention aims to reduce deterioration in legibility when using a white developer as a base.

SUMMARY

An image forming apparatus disclosed in the application includes an image process part that creates image data including pixel values of a process color image and pixel values of white which becomes a base of the process color image based on image forming data for forming an image with predetermined colors; and an image forming process part that forms the image on a medium using a process color developer and a white developer based on the image data created in the image processing part. Wherein, the image process part that determines a black portion in which a combination of the pixel values of the process color image is regarded as black and a non-black portion in which the combination of the pixel values of the process color image is regarded as a color other than black, and identifies the pixel values of white for the base of the process color image in the image data such that an usage amount of the white developer for the black portion is less than that for the non-black portion.

An image forming method disclosed in the application includes generating image data including pixel values of a process color image and pixel values of white which becomes a base of the process color image based on image forming data for forming an image with a predetermined color; and forming the image on a medium using a process color developer and a white developer based on the image data created. Wherein, when generating the image data, the pixel values of white for a black portion in which a combination of the pixel values of the process color is regarded as black is identified such that an usage amount of the white developer for the black portion is less than that for a non-black portion in which the combination of the pixel values of the process color is regarded as a color other than black.

According to one embodiment of the present invention, deterioration in legibility can be reduced even when a white developer is used as a base.

BRIEF DESCRIPTION OF THE DRAWINGS

FIG. 7 is a schematic view showing one example of an LUT according to Embodiment 1.

FIG. 11 is a flowchart showing color conversion processing according to Embodiment 2.

DETAILED DESCRIPTION OF EMBODIMENTS

Embodiment 1

Figure 1:
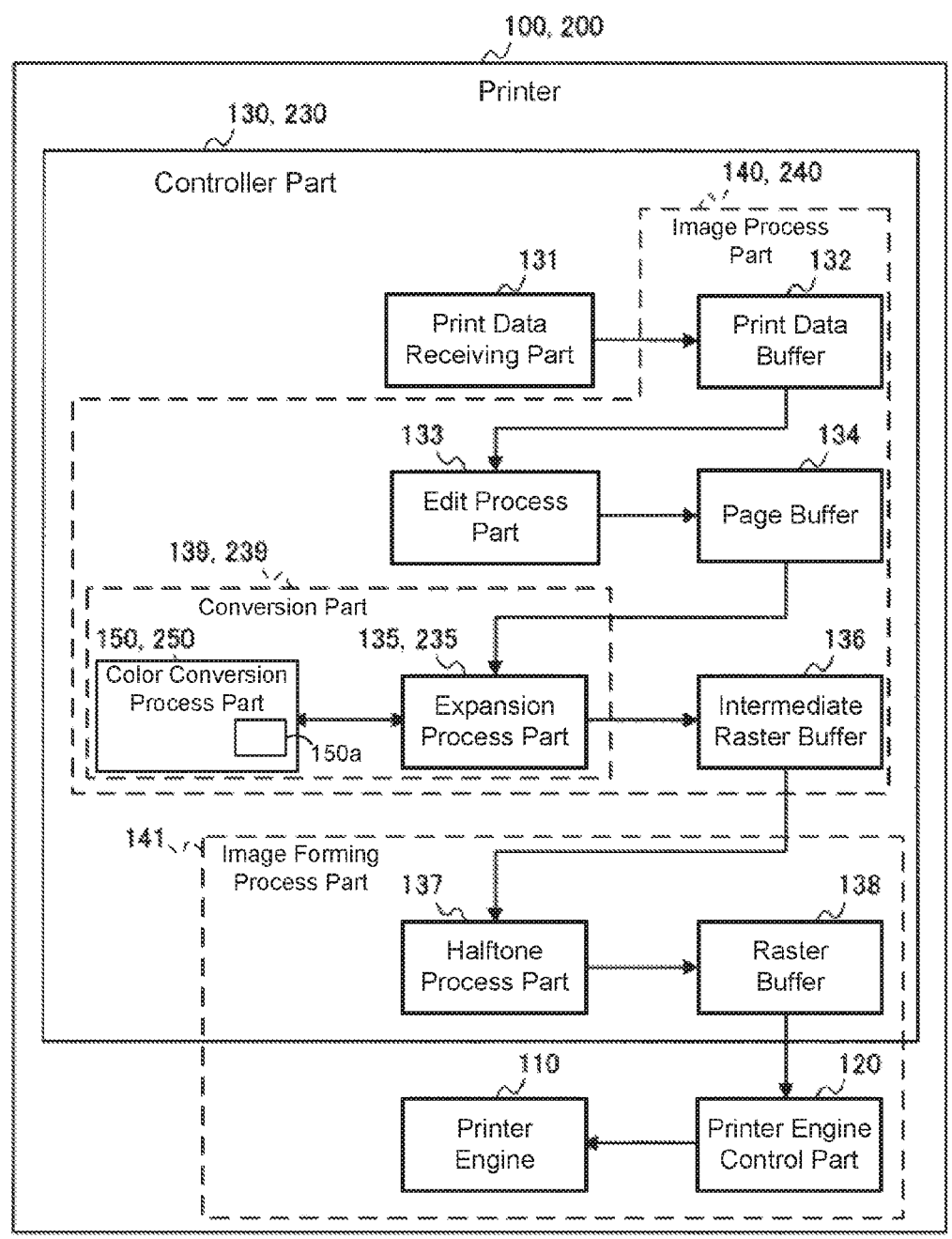
FIG. 1 is a block diagram schematically showing a configuration of a printer according to Embodiments 1 and 2.

FIG. 1 is a block diagram schematically showing a configuration of a printer 100, which is an image forming apparatus according to Embodiment 1. The printer 100 is equipped with a printer engine 110, a printer engine control part 120, and a controller part 130.

Figure 2:
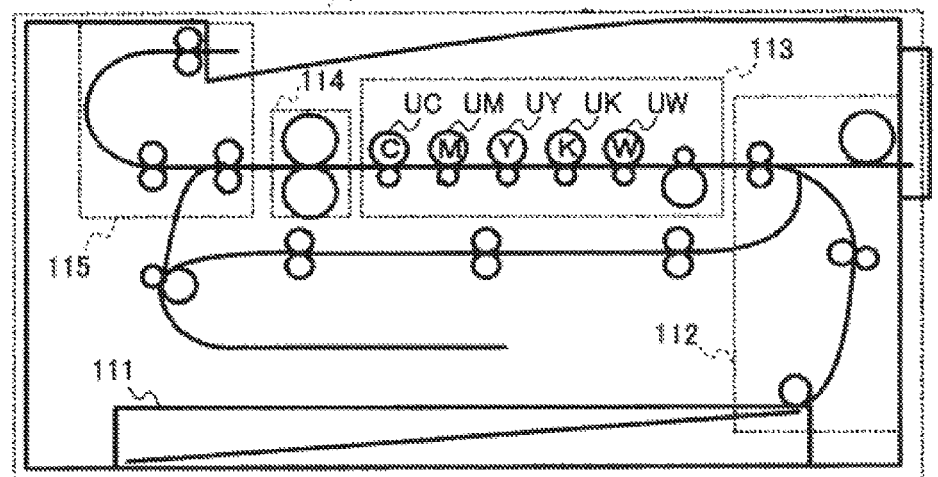
FIG. 2 is a cross-sectional view showing a schematic configuration of a printer engine according to Embodiments 1 and 2.

The printer engine 110 forms an image on a medium according to instructions from the printer engine control part 120. FIG. 2 is a cross-sectional view showing a schematic configuration of the printer engine 110. The printer engine 110 is equipped with a sheet feeding tray 111, a sheet feeding part 112, an image forming part 113, a fuser 114, and an ejection part 115.

The sheet feeding tray 111 is a tray for accommodating print sheets as mediums in a stacked manner. The sheet feeding part 112 conveys the print sheets in the sheet feeding tray 111 to the image forming part 113 one by one.

The image forming part 113 performs printing (image forming) on the fed print sheet based on the print data (image forming data) sent to the printer 100 as one print job. The image forming part 113, as shown in FIG. 2, includes five image forming units UC, UM, UY, UK, and UW (hereinafter referred to as an image forming unit UN when there is no need to specifically distinguish between each of them) configured to form each of toner images (developer images) of C, M, Y, K and W.

The five image forming units UN of the image forming part 113 are, for example, digital color printers of an LED (Light Emitting Diode) system, and are arranged in order from the insertion side to the ejection side of the print sheet. The image forming unit UN of each color includes a photosensitive drum, a charge roller, an LED head, a development part, and a transfer roller, which are not illustrated. The photosensitive drum rotates in one direction, and the charge roller uniformly charges the surface of the photosensitive drum. The LED head exposes the surface of the charged photosensitive drum according to the image information included in the print data to form an electrostatic latent image of each color. The development part includes a development roller and a toner cartridge accommodating a toner as a developer, and develops an electrostatic latent image of the corresponding color to form a toner image on the photosensitive drum. The transfer rollers transfer the toner image formed on the photosensitive drum to a print sheet.

The transferring of the toner image to the print sheet is performed in the order of W, K, Y, M, and C. This is to shield the color of the print sheet with a W toner by transferring the W toner image on the lowermost layer when using a colored print sheet and laminating toners of various colors on the W toner to make it possible to obtain an equivalent color development when printing on a white print sheet. Further, the image forming unit UN is driven by a separate unillustrated motor.

The print sheet to which a toner image is transferred is carried to the fuser 114. The fuser 114 is equipped with a roller for fusing and a roller for pressure application. The fuser 114, for example, fuses the toner on the print sheet with heat by a heater, etc., and pressure by rollers. The ejection part 115 ejects the print sheet on which a toner image was fused to an ejection tray.

Returning to FIG. 1, the printer engine control part 120 reads a raster image of one page from the controller part 130 and operates the printer engine 110 to perform printing of the raster image that was read.

The controller part 130 receives print data, and creates a raster image, which is image data to be printed by the printer engine 110. The controller part 130 is equipped with a print data receiving part 131 as a receiving part, a print data buffer 132 as an image forming data buffer, an edit process part 133, a page buffer 134, an expansion process part 135, an intermediate raster buffer 136, a halftone process part 137, a raster buffer 138, and a color conversion process part 150.

The print data receiving part 131 receives print data from an outside of the printer 100. The print data is data for forming an image with a predetermined color, and includes a command for forming an image with the predetermined color. For example, it is assumed that the print data includes a drawing command and color information as an image signal. Further, specifically, the print data receiving part 131 is an interface such as, e.g., a network and a USB. The print data buffer 132 is a buffer for temporarily storing the print data received by the print data receiving part 131.

The edit process part 133 reads out the print data from the print data buffer 132, performs a command analysis and creates drawing data for each page, and stores the coded data in which the result is display-coded to the page buffer 134. Further, in this embodiment, it is assumed that the image signal included in the print data is expressed by 8-bit values (0 to 255) of each color of RGB, CMYK, or CMYKW. The page buffer 134 is a buffer for temporarily storing the coded data created by the edit process part 133. In another embodiment, the image signal (or pixel values) may be expressed by a percentage from 0% to 100%.

The expansion process part 135 reads out the coded data of one page from the page buffer 134, and stores the converted image data, which is image data in which the print content of the entire page is converted to a raster image, in the intermediate raster buffer 136. At this time, all of the image signals of RGB, CMYK or CMYKW included in the coded data are each converted to an image signal of CMYKW by the color conversion process part 150. The color conversion process part 150 converts the image signal to an image signal of CMYKW. The processing in the color conversion process part 150 will be described later. Furthermore, the expansion process part 135 and the color conversion process part 150 constitute a conversion part 139. The intermediate raster buffer 136 is a buffer for temporarily storing the converted image data converted by the expansion process part 135 and the color conversion process part 150.

The aforementioned print data buffer 132, edit process part 133, page buffer 134, expansion process part 135, intermediate raster buffer 136, and color conversion process part 150 constitute an image process part 140 configured to create converted image data from the print data received by the print data receiving part 131. The image process part 140, based on the image forming data (print data) for forming an image with a predetermined color, creates image data including a pixel value of the process color image and a pixel value of white which becomes a base of the process color image. Here, for the portion in which the color shown by the process color is black, the image process part 140 identifies a white pixel value in the image data so that the usage amount of the white developer is less than the portion in which the color shown by the process color is a color other than black. Here, the image process part 140 judges such that the portion in which each of cyan, magenta and yellow color information included in the print data is a value falling within a predetermined range including 100%, or the portion in which the black color information is a value falling in a predetermined range including 100% is a portion in which the combination of the pixel values of the process colors is black. Further, the image process part 140 judges such that the portion in which each of red, green, and blue color information included in the print data is a value falling in a predetermined range including 0 is a portion in which the combination of the pixel values of the process colors is black. These above portions judged as "BLACK" are defined as "black portions" in the invention. Any other portions other than the black portions in the print data are regarded as "non-black portions."

The halftone process part 137 reads converted image data of one page from the intermediate raster buffer 136, converts the 8-bit pixel value of each of CMYKW to 1-bit pixel value of CMYKW that are printable by the printer engine 110, and stores the raster image after the conversion in the raster buffer 138. For example, the halftone process part 137 converts the 8-bit pixel value to a 1-bit pixel value by performing a halftone process such as, e.g., a dither method and an error diffusion method. The raster buffer 138 is a buffer for temporarily storing the raster image converted by the halftone process part 137.

The aforementioned printer engine 110, printer engine control part 120, halftone process part 137, and raster buffer 138, based on the converted image data (raster image) converted by the image process part 140, functions as an image forming process part (print process part) 141 configured to form an image on a medium using process color developers and a white developer.

Figure 3:
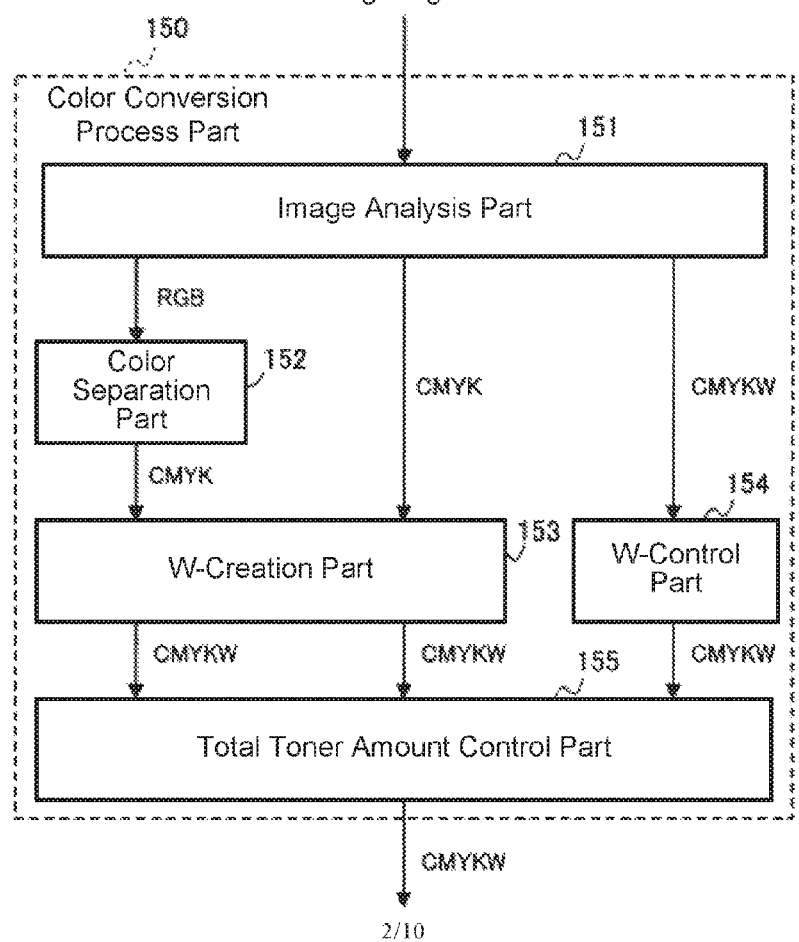
FIG. 3 is a block diagram schematically showing a configuration of a color conversion process part according to Embodiment 1.

FIG. 3 is a block diagram schematically showing a configuration of the color conversion process part 150. The color conversion process part 150 is equipped with an image analysis part 151, a color separation part 152, a W-creation part 153 as a white color creation part, a W-control part 154 as a white color control part, and a total toner amount control part 155.

The image analysis part 151 analyzes the image signal provided by the expansion process part 135, and judges whether the image signal is RGB, CMYK, or CMYKW. Then, when the image signal provided by the expansion process part 135 is RGB, the image analysis part 151 provides it to the color separation part 152, and when it is CMYK, it is provided to the W-creation part 153, and when it is CMYKW, it is provided to the W-control part 154.

The color separation part 152 color-separates the image signal of RGB, and creates an image signal of CMYK. Then, the color separation part 152 provides the image signal of CMYK to the W-creation part 153. The W-creation part 153 applies the W image signal to the image signal of CMYK to create an image signal of CMYKW. Then, the W-creation part 153 provides the image signal of CMYKW to the total toner amount control part 155.

The W-control part 154 creates a corrected image signal of CMYKW by correcting the image signal of W to limit the white toner amount in the image signal of CMYKW. Then, the W-control part 154 provides the corrected image signal of CMYKW to the total toner amount control part 155. When the image signal of CMYKW exceeds the upper limit value of the total toner amount of the CMYKW determined by the printer 100 in advance, the total toner amount control part 155 corrects the image signal of each color so that the image signal of CMYKW does not exceed the upper limit value. Then, the total toner amount control part 155 provides the image signals of CMYKW to the expansion process part 135.

Figure 4A:
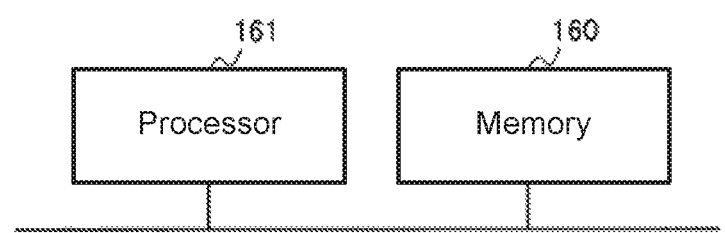
FIG. 4A and FIG. 4B are schematic views showing one example of a hardware configuration of a print data buffer, an edit process part, a page buffer, a development process part, an intermediate raster buffer, a halftone process part, a raster buffer, a color conversion process part, and a printer engine control part.
Figure 4B:
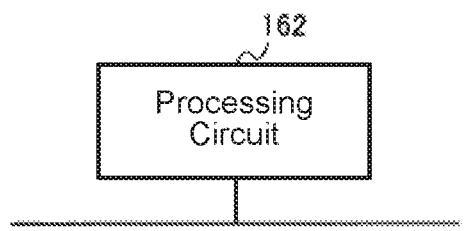

As shown in FIG. 4A, a part or all of the aforementioned print data buffer 132, edit process part 133, page buffer 134, expansion process part 135, intermediate raster buffer 136, halftone process part 137, raster buffer 138, color conversion process part 150, and printer engine control part 120 may be realized by a memory 160 and a processor 161 such as a CPU (Central Processing Unit) for executing a program stored in the memory 160. Such a program may be provided via a network or provided by being recorded in a recording medium. Further, as shown in FIG. 4B, a part or all of the aforementioned print data buffer 132, edit process part 133, page buffer 134, expansion process part 135, intermediate raster buffer 136, halftone process part 137, raster buffer 138, color conversion process part 150, and printer engine control part 120 may be realized by a processing circuit 162 such as, e.g., a single circuit, a decoder circuit, a programmed processor, a parallel programming processor, ASIC (Application Specific Integrated Circuits) and a FPGA (Field Programmable Gate Array).

Figure 5:
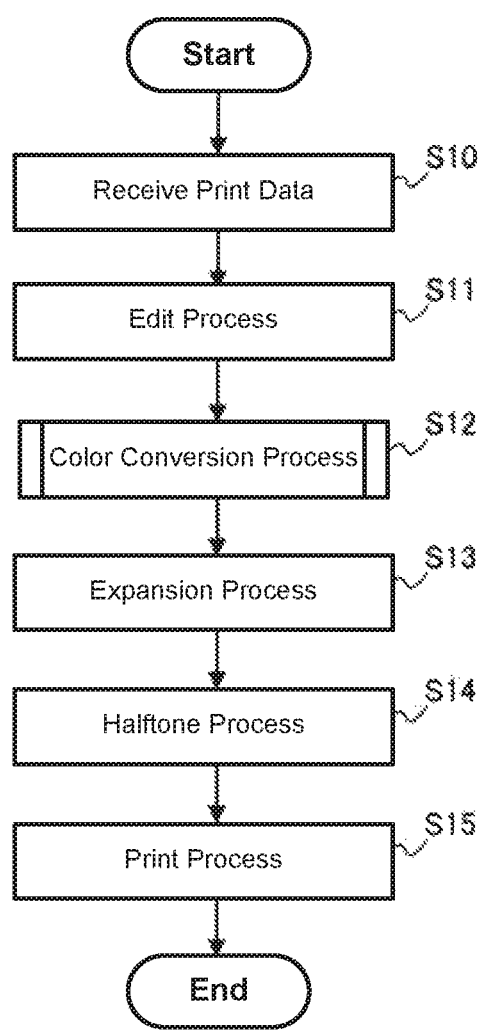
FIG. 5 is a flowchart showing one example of an operation in a printer according to Embodiment 1.

Next, operations of the printer 100 will be described. FIG. 5 is a flowchart showing one operational example in the printer 100. In S10, when the print data receiving part 131 receives the print data from the outside, the print data receiving part 131 temporarily stores the received print data in the print data buffer 132. In S11, the edit process part 133 reads the print data from the print data buffer 132, and performs a command analysis and a drawing per page (or edit process). Then, the edit process part 133 makes the drawn image data into a display code to create coded data, and stores it in the page buffer 134.

In S12, the expansion process part 135 reads out coded data of one page from the page buffer 134, and in the color conversion process part 150, converts the image signal included in the coded data into an image signal of CMYKW in each color having an 8-bit value. The color conversion process in S12 will be described in detail with reference to FIG. 6. In S13, the expansion process part 135, for the image signal of CMYKW color-converted by the color conversion process part 150 in S12, stores the converted image data in which the entire page is converted into an 8-bit raster image of CMYKW in the intermediate raster buffer 136 (or expansion process).

In S14, the halftone process part 137 reads the raster image of the image signal of CMYKW from the intermediate raster buffer 136, and converts the 8-bit image signal value (pixel value) of each color into a 1-bit image signal value of CMYKW of each color which can be developed by the printer engine 110. Then, the halftone process part 137 stores the converted raster image in the raster buffer 138 (or halftone process). In S15, the printer engine control part 120 reads the raster image of one page from the raster buffer 138, and operates the printer engine 110 to perform printing of the raster image that was read (or print process).

Figure 6:
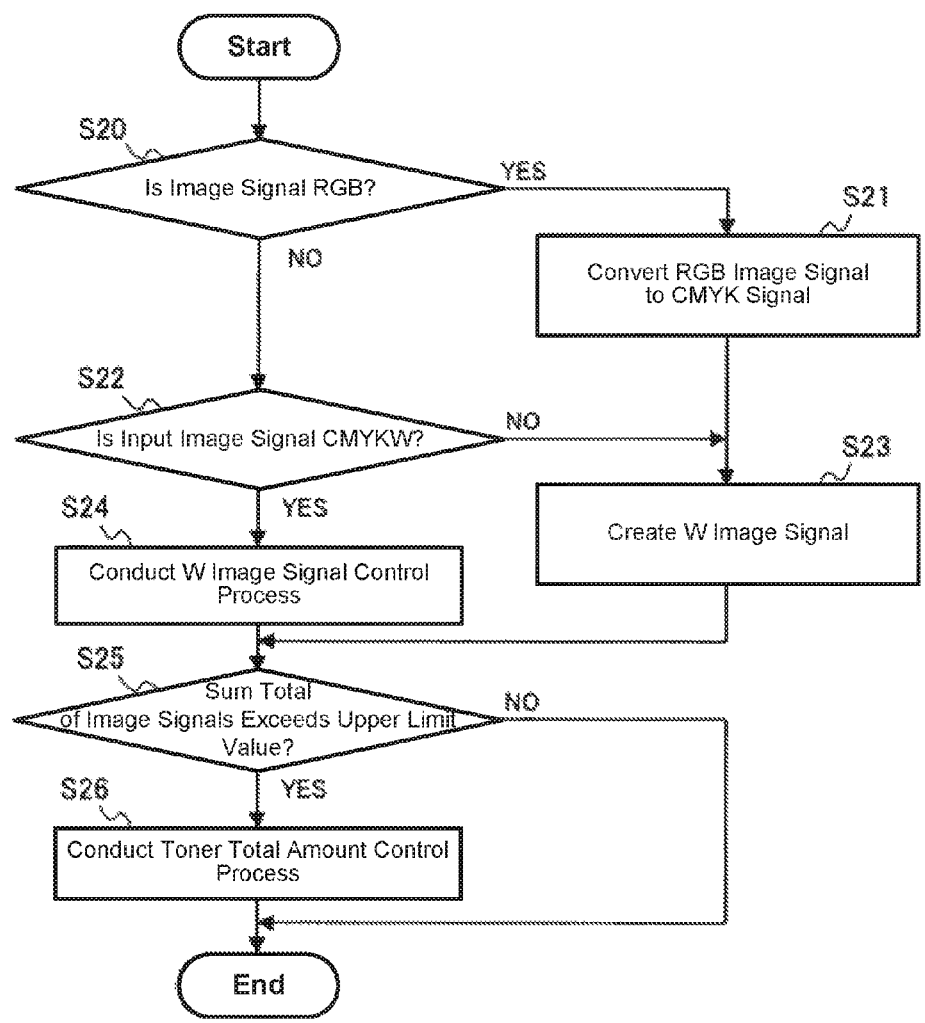
FIG. 6 is a flowchart showing color conversion processing according to Embodiment 1.

FIG. 6 is a flowchart showing the color conversion process according to Embodiment 1. In S20, the image analysis part 151 analyzes various image signals provided from the expansion process part 135, and judges whether or not the image signal is RGB. When the image signal is RGB (Yes in S20), the process shifts to S21. When the image signal is not RGB (No in S20), the process shifts to S22. In S21, the color separation part 152 converts the image signal of RGB to an image signal of CMYK with a known technology. Then, the color separation part 152 provides the image signal of CMYK to the W-creation part 153, and the process shifts to S23.

In S22, the image analysis part 151 judges whether or not the image signal provided from the expansion process part 135 is CMYKW. When the image signal is not CMYKW (No in S22), the process shifts to S23. When the image signal is CMYKW (Yes in S22), the process shifts to S24.

In S23, the W-creation part 153 creates and applies a W image signal corresponding to the white color toner amount to be applied to an image signal of CMYK provided from the color separation part 152 or an image signal of CMYK provided from the image analysis part 151 to create an image signal of CMYKW. Then, the W-creation part 153 provides the image signal of CMYKW to the total toner amount control part 155, and the process shifts to S25. Here, the W-creation part 153 identifies the image signal value of W from the image signal value of each color shown by image signal "LUT") as color conversion information. In other words, the LUT stores information for identifying the image signal value of W from the image signal values of CMYK.

Figure 7:
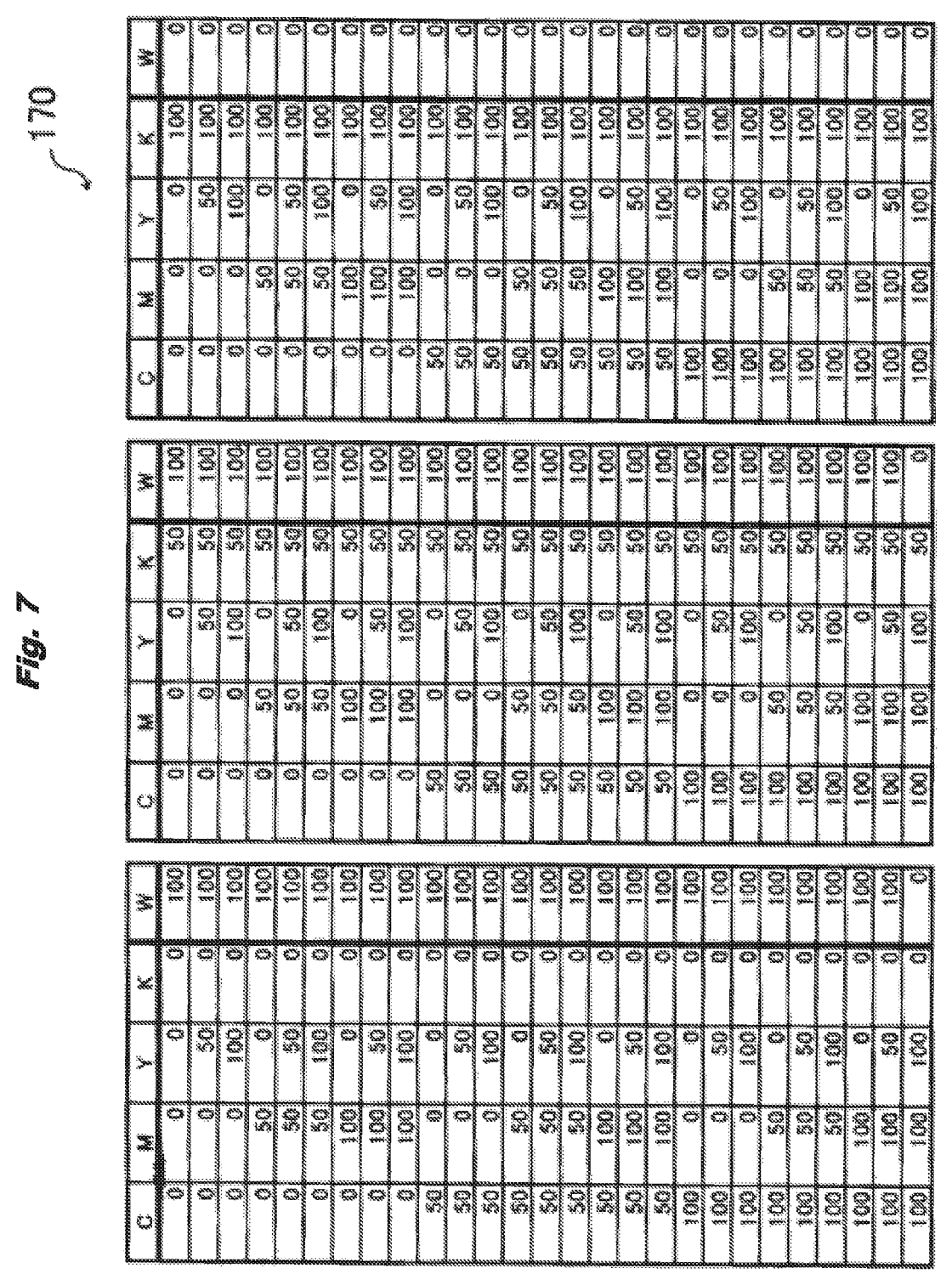

FIG. 7 is a schematic view showing one example of an LUT. As shown, the LUT 170 is a four-dimensional look-up table in which the number of input channels is "4 (CMYK)", the number of output channels is "1 (W)", and the number of grids is "3". The LUT 170 shows the image signal value as a percentage between 0 to 100%. For example, when the image signal values of CMYK to be inputted are "C=0% (0), M=0% (0), Y=0% (0), and K=0% (0)" (however, the number in the parentheses is an 8-bit integer value), the value of the image signal of W to be created is W=100% (255). Similarly, when the image signal values of CMYK to be inputted are "C=100% (255), M=100% (255), Y=100% (255), K=0% (0)", the value of the W image signal to be created is W=0% (0).

Further, when an image signal value of CMYK to be inputted is not stored in the LUT 170, the W-creation part 153 determined the white color toner amount using a known LUT interpolation method such as, e.g., a volume interpolation method and a trigonal pyramid interpolation method. Furthermore, although it is not illustrated, an LUT in which an image signal value of W corresponding to the combinations of all image signal values of CMYK is identified may be used.

In this embodiment, when the combination of the image signal values of CMYK is judged to be black, the W-creation part 153 makes the W image signal value a value in which the usage amount of the white toner is limited compared to when the combination of the image signal values of CMYK is a color other than black, and here, it is 0% which is a value that the white toner is not used at all. Further, when the combination of the image signal values of CMYK is judged to be a color other than black, the W-creation part 153 makes the W image signal value a value in which the usage amount of the white toner is not limited, and here, it is 100%. In addition, the W image signal value is not limited to 0% or 100% and when the image signal value of CMYK is judged to be black, it is enough that the image signal value of W is a value in which the usage amount of the white toner is limited compared to when the image signal value of CMYK is judged to be another color.

Furthermore, in this embodiment, when each of the image signal values of CMY is 100%, or when the image signal value of K is 100%, the combination of the image signal values of CMYK is judged to be black, but it is not limited to such an example. For example, when the image signal values of CMY are in a predetermined range including 100% (for example, 90% to 100%), or when the image signal value of K is in a predetermined range including 100% (for example, 90% to 100%), the image signal values of CMYK may be judged to be black.

Further, lower thresholds of these ranges may be set differently for each color. For example, C=90%, M=90%, Y=85% and K=80%. Herein, the range in which the signal value is judged black means degrees by which a deterioration of legibility becomes notable due to a high contrast between black and white that is caused when the white toner is mixed into the black toner. If making the range very large, a signal value that is not only pure black but also colorful to some degree may be judged black, causing to reduce the use amount of white toner, resulting that color reproductivity of the print color is deteriorated because the effect to block a base color of print medium becomes small. Accordingly, the lower threshold is determined based on various factors that operators learned through their experiences.

Returning to FIG. 6, in S24, the W-control part 154 corrects the image signal of W with respect to the image signal of CMYKW inputted from the image analysis part 151 and provides the corrected image signal of CMYKW to the total toner amount control part 155. The W-control part 154 refers to the LUT 170 to identify the image signal value of W from the image signal values of CMYK included in the image signals of CMYKW. For example, the W-control part 154 calculates the correction rate WC of the image signal of W (0%≤WC≤100%) from the image signal values of CMYK among the image signals of CMYKW. The correction rate WC corresponds to the image signal values of CMYK included in the image signals of CMYKW and is the image signal value of W identified based on the LUT 170. Also, the W-control part 154 corrects the value $V_{W1}$ of the image signal of W to $V_{W2}$ according to the following formula (1). Here, the value $V_{W1}$ is the W image signal value included in the CMYKW image signal inputted from the image analysis part 151 and the value $V_{W2}$ is the corrected image signal value of W.

$$V_{W2} = WC \div 100 \times V_{W1} \qquad (1)$$

These above processes are referred as W image signal control process.

In S25, for the CMYKW image signal provided by the W-creation part 153 or the image signal of CMYKW provided by the W-control part 154, the total toner amount control part 155 judges whether or not the sum total of the image signal values of the CMYKW image signals exceeds the upper limit value of the CMYKW total toner amount set by the printer 100 in advance. When the sum total of the image signal values of the CMYKW image signals exceeds the upper limit value (Yes in S25), the process shifts to S26. When the sum total of the image signal values of the CMYKW image signals does not exceed the upper limit value (No in S25), the process is completed.

In S26, the total toner amount control part 155 corrects the CMYKW image signal so that the sum total of the image signal values of the CMYKW image signals does not exceed the upper limit value TL of the CMYKW total toner amount set by the printer 100 in advance. For example, when the image signal values of the CMYKW image signals inputted in the total toner amount control part 155 are C=255 (100%), M=255 (100%), Y=255 (100%), K=128 (50%), and W=0 (0%), and the upper limit value TL of the CMYKW total toner amount is 765 (300%), the sum total TO=893 (350%) of the CMYKW image signals exceeds the upper limit value TL of the CMYKW total toner amount. Therefore, the total toner amount control part 155 corrects each of the CMYKW image signal values ($V_1$) using the following formula (2) to calculate the image signal value ($V_2$) after the correction.

$$V_2 = V_1 - (TO - TL) \div 5 \qquad (2)$$

These above processes are referred as toner total amount control process.

In the aforementioned example, according to the formula (2), each of the image signal values of CMYKW ($V_{c1}$, $V_{m1}$, $V_{y1}$, $V_{k1}$, $V_{w1}$) becomes the corrected image signal values ($V_{c2}$, $V_{m2}$, $V_{y2}$, $V_{k2}$, $V_{w2}$).

$$TO = V_{c1} + V_{m1} + V_{y1} + V_{k1} + V_{w1} = 893$$

$$TL = 765$$

$$V_{c2} = V_{c1} - (TO - TL) \div 5 = 255 - (893 - 765) \div 5 = 229$$

$$V_{m2}=V_{m1}-(TO-TL)\div 5=255-(893-765)\div 5=229$$

$$V_{y2}=V_{y1}-(TO-TL)\div 5=255-(893-765)\div 5=229$$

$$V_{k2}=V_{k1}-(TO-TL)\div 5=128-(893-765)\div 5=102$$

$$V_{w2}=V_{w1}-(TO-TL)\div 5=0-(893-765)\div 5=0$$

When the calculated value is lower than 0, the image signal value after the correction is 0.

As described above, according Embodiment 1, since a white developer is not used for a black base, the process color developer can be prevented from sinking into the white developer and mixing together to worsen the legibility.

Embodiment 2

As shown in FIG. 1, the printer 200 according to Embodiment 2 is equipped with a printer engine 110, a printer engine control part 120, and a controller part 230. The printer 200 according to Embodiment 2 is configured in the same manner as in the printer 100 according to Embodiment 1 except for the controller part 230, so the controller part 230 will be described hereinafter.

The controller part 230 is equipped with a print data receiving part 131, a print data buffer 132, an edit process part 133, a page buffer 134, an expansion process part 235, an intermediate raster buffer 136, a halftone process part 137, a raster buffer 138, and a color conversion process part 250. Since the controller part 230 in Embodiment 2 is configured in the same manner as in the controller part 130 of Embodiment 1 except for the expansion process part 235 and the color conversion process part 250, hereinafter, the expansion process part 235 and the color conversion process part 250 will be described. Further, in Embodiment 2, it is presumed that the print data includes a W amount adjustment command showing a W toner amount selected by a user.

The expansion process part 235 reads the coded data of one page from the page buffer 134, creates converted image data in which the print content of the entire page is converted to a raster image, and stores the converted image data in the intermediate raster buffer 136. At this time, the expansion process part 235 provides image signals of RGB, CMYK or CMYKW included in the coded data to the color conversion process part 250 and makes the color conversion process part 150 convert all of the image signals to image signals of CMYKW. Here, the expansion process part 235 in Embodiment 2 provides the image signals and the W amount adjustment command to the color conversion process part 250.

Figure 8:
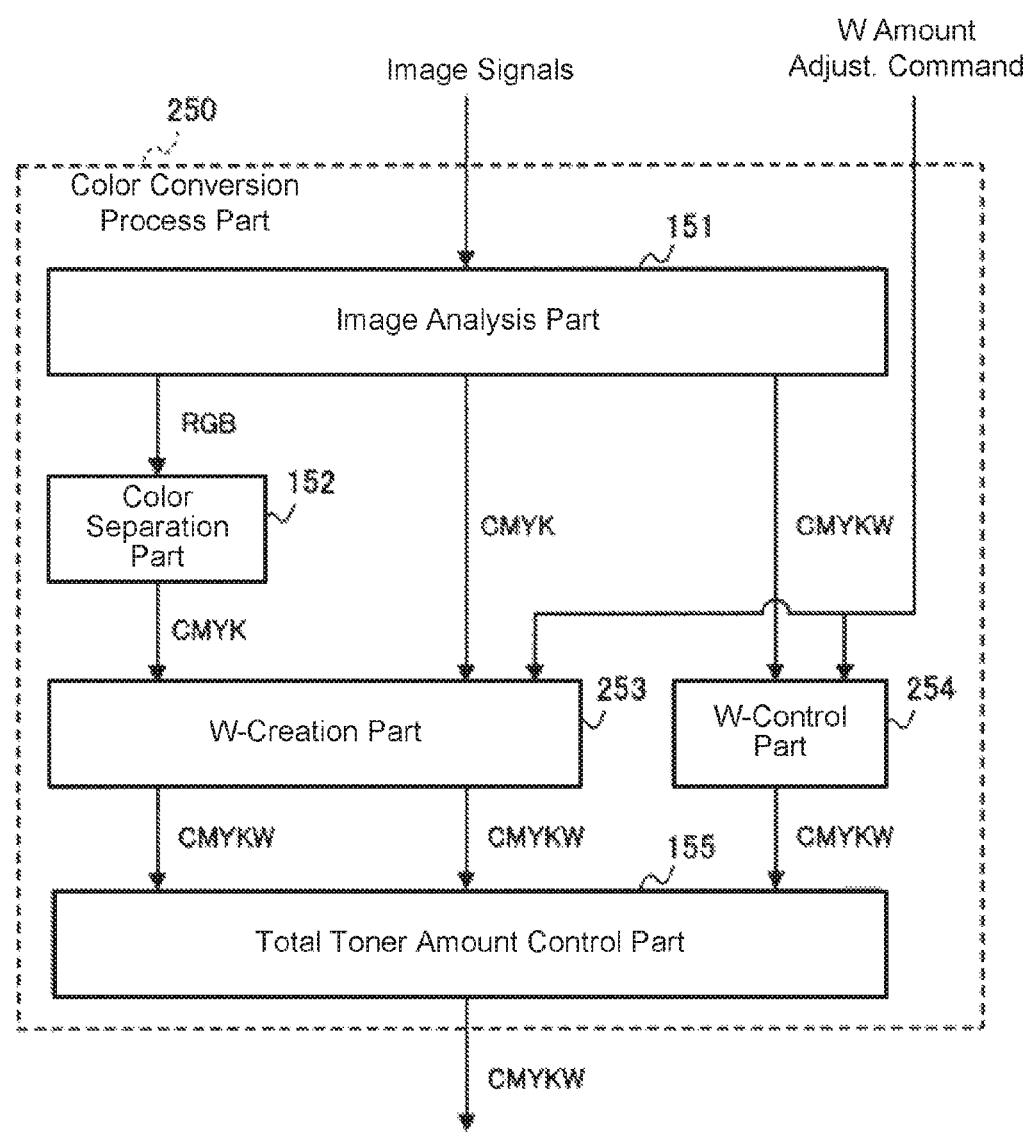
FIG. 8 is a block diagram schematically showing a configuration of a color conversion process part according to Embodiment 2.

The color conversion process part 250 refers to the W amount adjustment command to convert the image signals to image signals of CMYKW. FIG. 8 is a block diagram schematically showing a configuration of the color conversion process part 250. The color conversion process part 250 is equipped with an image analysis part 151, a color separation part 152, a W-creation part 253, a W-control part 254, and a total toner amount control part 155. Since the color conversion process part 250 of Embodiment 2 is configured in the same manner as in the color conversion process part 150 of Embodiment 1 except for the W-creation part 253 and the W-control part 254, hereinafter, the W-creation part 253 and the W-control part 254 will be described.

The W-creation part 253 applies the image signal of W to the image signal of CMYK to create image signals of CMYKW. At this time, the W-creation part 253 refers to the W amount adjustment command to be inputted from the expansion process part 235. Then, the W-creation part 253 provides the CMYKW image signal to the total toner amount control part 155. The W-control part 254 creates a corrected CMYKW image signal by correcting the image signal of W to limit the white toner amount in the image signal of the CMYKW. At this time, the W-control part 254 refers to the W amount adjustment command inputted from the expansion process part 235. Then, the W-control part 254 provides the corrected image signal of CMYKW to the total toner amount control part 155.

Further, the expansion process part 235 and the color conversion process part 250 constitute a conversion part 239. As described above, by adjusting the white pixel value in the converted image data, the conversion part 239 is able to adjust the usage amount of the white developer according to the instructions from a user. Further, the aforementioned print data buffer 132, edit process part 133, page buffer 134, expansion process part 235, intermediate raster buffer 136, and color conversion process part 250 constitute an image process part 240 configured to create converted image data from the print data received by the print data receiving part 131.

Figure 9A:
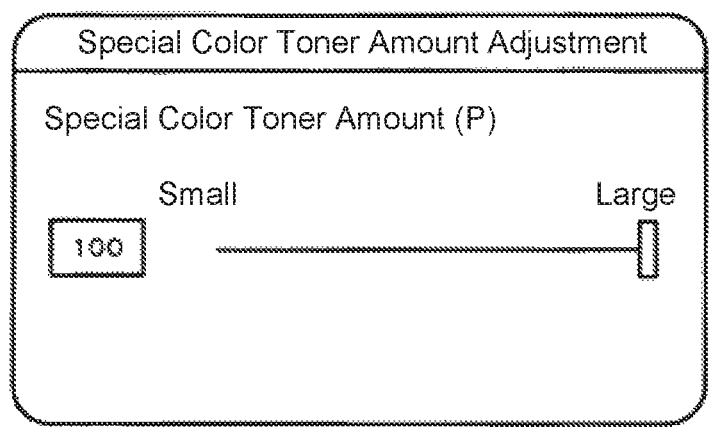
FIG. 9A and FIG. 9B are schematic views showing examples of screens that receive a while toner amount adjustment from a user.
Figure 9B:
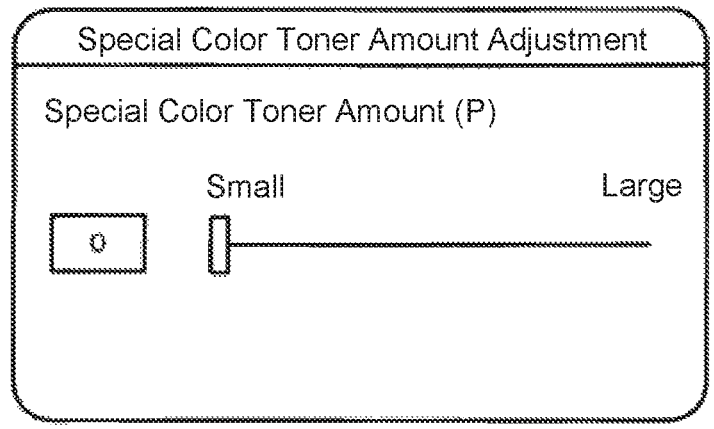

Next, operations of the printer 200 according to Embodiment 2 will be described. In Embodiment 2, it is presumed that the print data includes a W amount adjustment command. For example, an unillustrated PC receives instructions from a user with an input apparatus such as, e.g., a keyboard and mouse, and a processor such as, e.g., a CPU, reads out and executes a printer driver from a memory to perform a print setting. The printer driver receives a white toner amount adjustment by a user. FIG. 9A and FIG. 9B are schematic views showing examples of displays that are displayed on a display apparatus such as, e.g., a display of a PC, in which the printer display receives an adjustment amount of a white toner from a user. As shown in FIG. 9A and FIG. 9B, the printer driver receives inputs of integer values in a range of 0 to 100 as a value for adjusting the amount of a special color toner, i.e., a white toner. For example, it is set such that as the integer value becomes larger, the amount of the white toner becomes larger. Then, the printer driver receives operations of the user and adds the W amount adjustment command to the print data. Here, the W amount adjustment command is, for example, an integer value in a range of 0 to 100.

Figure 10:
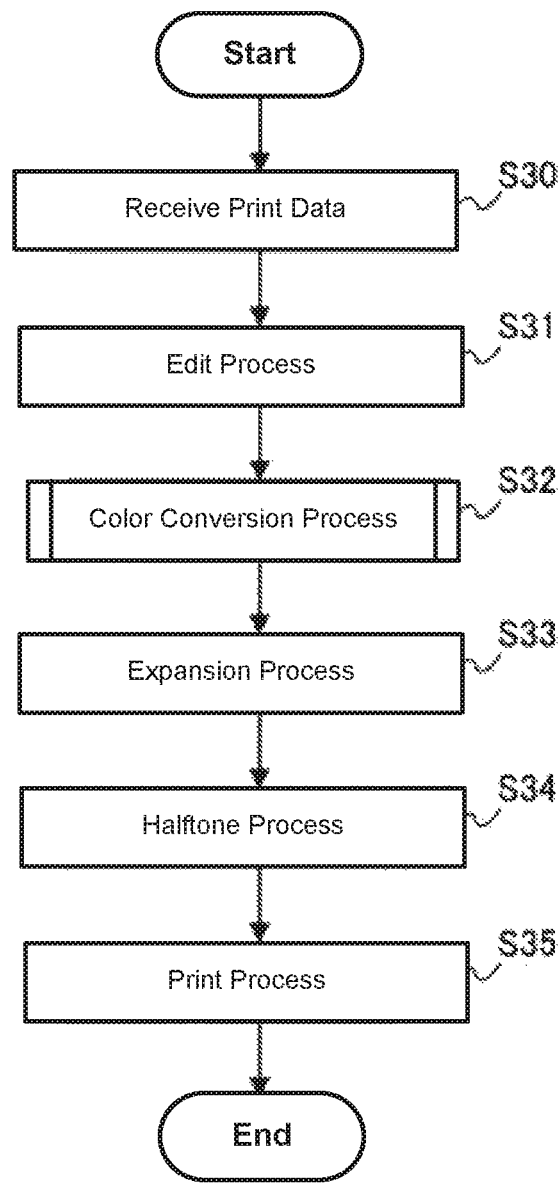
FIG. 10 is a flowchart showing one operational example in a printer according to Embodiment 2.

FIG. 10 is a flowchart showing one operational example of the printer 200. In S30, the print data receiving part 131 receives the print data from the outside and temporarily stores the received print data in the print data buffer 132. As described above, the print data received here includes a W amount adjustment command. In S31, the edit process part 133 reads the print data from the print data buffer 132 and performs a command analysis and drawing for each page. Then, the edit process part 133 makes the drawn image data into a display code to create coded data and stores it in the page buffer 134.

In S32, the expansion process part 235 reads coded data of one page from the page buffer 134, and the color conversion process part 250 converts the image signal included in the coded data to image signals of CMYKW of each color having an 8-bit value. At this time, the expansion process part 235 also provides the W amount adjustment command to the color conversion process part 250 and makes it adjust the toner amount of W. The color conversion process in S32 will be described in detail with reference to FIG. 11. In S33, the expansion process part 235, for image signals of CMYKW color-converted by the color conversion process part 250 in S32 stores the converted image data in which the entire page is converted into an 8-bit CMYKW raster image in the intermediate raster buffer 136.

In S34, the halftone process part 137 reads the raster image of the CMYKW image signal from the intermediate raster buffer 136, and converts the 8-bit image signal of each color into 1-bit CMYKW image signal values of each color which can be developed by the printer engine 110. Then, the halftone process part 137 stores the converted raster image in the raster buffer 138. In S35, the printer engine control part 120 reads the raster image of one page from the raster buffer 138, and operates the printer engine 110 to perform printing of the raster image that was read.

FIG. 11 a flowchart showing the color conversion process according to Embodiment 2. In S40, the image analysis part 151 analyzes various image signals provided from the expansion process part 235 and judges whether or not the image signal is RGB. When an image signal is RGB (Yes in S40), the process shifts to S41. When the image signal is not RGB (No in S40), the process shifts to S42. In S41, the color separation part 152 converts the image signals of RGB to image signals of CMYK with a known technology. Then, the color separation part 152 provides the CMYK image signals to the W-creation part 153, and the process shifts to S43.

In S42, the image analysis part 151 judges whether or not the image signal provided from the expansion process part 235 is CMYKW. When the image signal is not CMYKW (No in S42), the process shifts to S43. When the image signal is CMYKW (Yes in S42), the process shifts to S44.

In S43, by referring to the W amount adjustment command provided from the expansion process part 235, the W-creation part 253 creates and applies a W image signal corresponding to the white color toner amount to be applied to an image signal of CMYK provided from the color separation part 152 or an image signal of CMYK provided from the image analysis part 151 to create an image signal of CMYKW. Then, the W-creation part 253 provides the image signal of CMYKW to the total toner amount control part 155 and the process shifts to S45. Here, in the same manner as in Embodiment 1, the W-creation part 253 identifies the base value $V_{wb}$ of the image signal value of W from the image signal values of each color as shown by the image signals of CMYK. Then, the W-creation part 253 identifies the W image signal value Vw using the following formula (3).

$$Vw=(We \div 100) \times Vwb \quad (3)$$

Here, the We is a value shown by the W amount adjustment command (an integer value between 0 to 100).

In S44, by referring to the W amount adjustment command provided from the expansion process part 235, the W-control part 254 corrects the image signal of W with respect to the image signal of CMYKW inputted from the image analysis part 151, and provides the corrected image signal of CMYKW to the total toner amount control part 155. The W-control part 254 refers to the LUT 170 and the W amount adjustment command to identify the image signal value of W from the image signal value of CMYK included in the image signal of CMYKW. For example, the W-control part 254 calculates a correction rate WC (0%≤WC≤100%) of the W image signal from the image signal value of CMYK among the image signal of CMYKW. The correction rate WC corresponds to the image signal value of CMYK included in the image signal of CMYKW and is the image signal value of W identified based on the LUT 170. Also, the W-control part 254 corrects the value $V_{W1}$ of the image signal of W to $V_{W2}$ according to the following formula (4). Here, the value $V_{w1}$ is an image signal value of W included in the CMYKW image signal inputted from the image analysis part 151 and the value $V_{w2}$ is an image signal value of W after the correction.

$$Vw2=(WC \div 100) \times (We \div 100) \times Vw1 \quad (4)$$

Here, We is a value (an integer value between 0 and 100) shown by the W amount adjustment command.

In S45, for the CMYKW image signal provided by the W-creation part 153 or the CMYKW image signal provided by the W-control part 154, the total toner amount control part 155 judges whether or not the sum total of the image signal values of the image signals of CMYKW exceeds the upper limit value of the CMYKW total toner amount control part that is set by the printer 100 in advance. When the sum total of the image signal values of the CMYKW image signals exceeds the upper limit value (Yes in S45), the process shifts to S46. When the sum total of the image signal values of the CMYKW image signals does not exceed the upper limit value (No in S45), the process is completed.

In S46, the total toner amount control part 155 corrects the image signals of CMYKW so that the sum total of the image signal values of the image signals of CMYKW does not exceed the upper limit value TL of the total toner amount of CMYKW that is set by the printer 100 in advance. Since this process is the same as in Embodiment 1, the description will be omitted.

As described above, according to Embodiment 2, since it has similar effects as Embodiment 1, the usage amount of the white toner can be adjusted for colors other than black and therefore, the deterioration of legibility for colors other than black can be reduced.

As for the W amount adjustment command, integral numbers from 0 to 100 were described in the above embodiment. As for another embodiment of the W amount adjustment command, a user may select classes such as LARGE, MEDIUM, and SMALL. In such a case, when the LARGE class is selected, integral number 75 is regarded selected, and the following processes proceed. When the MEDIUM class is selected, integral number 50 is regarded selected. When the SMALL class is selected, integral number 25 is regarded selected and the following processes proceed.

In the aforementioned Embodiments 1 and 2, the image signal value of W limiting the usage amount of the toner of W is identified using the LUT 170, but it is not limited to such an example, and for example, limiting information showing the combinations of image signal values of CMYK limiting the usage amount of the toner of W, or non-limiting information showing the combination of the image signal values of CMYK not limiting the usage amount of the toner of W may be stored in the memory 150a of the color conversion process part 150 to identify the image signal value of W. Specifically, in the case of a combination of image signal values of CMYK shown by limiting information, the color conversion process part 150 can use a predetermined first image signal value, and in the case of a combination of image signal values of CMYK not shown by non-limiting information, the color conversion process part 150 can use a predetermined second image signal value. Further, in the case of a combination of image signal values of CMYK not shown by non-limiting information, the color conversion process part 150 can use a predetermined first image signal value, and in the case of a combination of image signal values of CMYK shown with non-limiting information, the color conversion process part 150 can use a predetermined second image signal value. Here, the first image signal value is a value in which the usage amount of the toner of W is less than the second image signal value.

In the aforementioned Embodiments 1 and 2, the image forming apparatus was described using the printers 100 and 200, but the image forming apparatus may be a multifunction machine, a copy machine, a facsimile device, etc.

What is claimed is:

1. An image forming apparatus, comprising:
   a processor; and
   a memory storing a computer-executable program, wherein,
   when the computer-executable program is executed, the processor is configured to function as;
      an image process part that creates image data including pixel values of a process color image and pixel values of white which becomes a base of the process color image based on image forming data for forming an image with predetermined colors; and
      an image forming process part that forms the image on a medium using a process color developer and a white developer based on the image data created in the image processing part, and
   the image process part;
      determines a black portion in which a combination of the pixel values of the process color image is regarded as black and a non-black portion in which the combination of the pixel values of the process color image is regarded as a color other than black, and
      identifies the pixel values of white for the base of the process color image in the image data such that an usage amount of the white developer for the black portion is less than that for the non-black portion.

2. The image forming apparatus according to claim 1, wherein
   the image process part determines that the usage amount of the white developer for the black portion is zero.

3. The image forming apparatus according to claim 1, wherein
   the image process part determines that
      a portion in which each of cyan, magenta and yellow color information included in the image forming data is a value falling within a predetermined range including 100% is the black portion, or
      a portion in which black color information is a value falling within a predetermined range including 100% is the black portion.

4. The image forming apparatus according to claim 1, wherein
   the image process part determines that a portion in which each of red, green and blue color information included in the image forming data is a value falling within a predetermined range including 0 is the black portion.

5. The image forming apparatus according to claim 1, wherein
   the image process part sets the pixel values of white between 0 and 255 in the image data.

6. The image forming apparatus according to claim 1, wherein
   the image process part sets the pixel values of white between 0% and 100% in the image data.

7. The image forming apparatus according to claim 1, wherein
   the image process part adjusts the usage amount of the white developer according to an instruction from a user by adjusting the pixel values of white in the image data.

8. The image forming apparatus according to claim 1, wherein
   the image process part receives a W amount adjustment command input by a user, the W amount adjustment command indicating degrees of a user's intension to change the usage amount of the white developer,
   the image process part reduce or increase the usage amount of the white developer for the black portion in proportion with the W amount adjustment command.

9. An image forming method, comprising:
   generating image data including pixel values of a process color image and pixel values of white which becomes a base of the process color image based on image forming data for forming an image with a predetermined color; and
   forming the image on a medium using a process color developer and a white developer based on the image data created, wherein,
   when generating the image data, the pixel values of white for a black portion in which a combination of the pixel values of the process color is regarded as black is identified such that an usage amount of the white developer for the black portion is less than that for a non-black portion in which the combination of the pixel values of the process color is regarded as a color other than black.

* * * * *